April 16, 1946.  R. B. COTTRELL  2,398,621
CAR TRUCK
Filed April 8, 1943  2 Sheets-Sheet 1
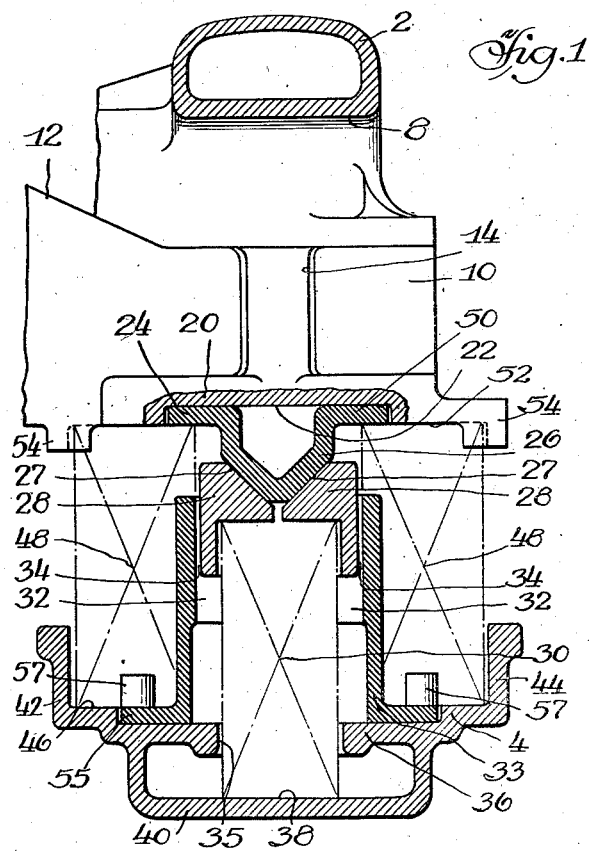
Fig.1
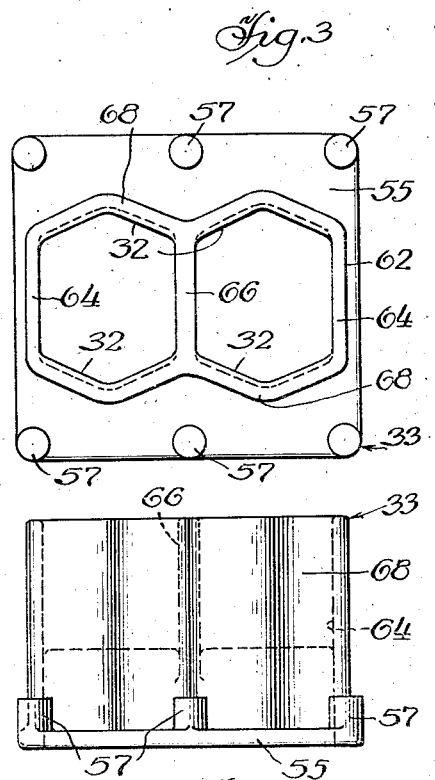
Fig.3
Fig.3A
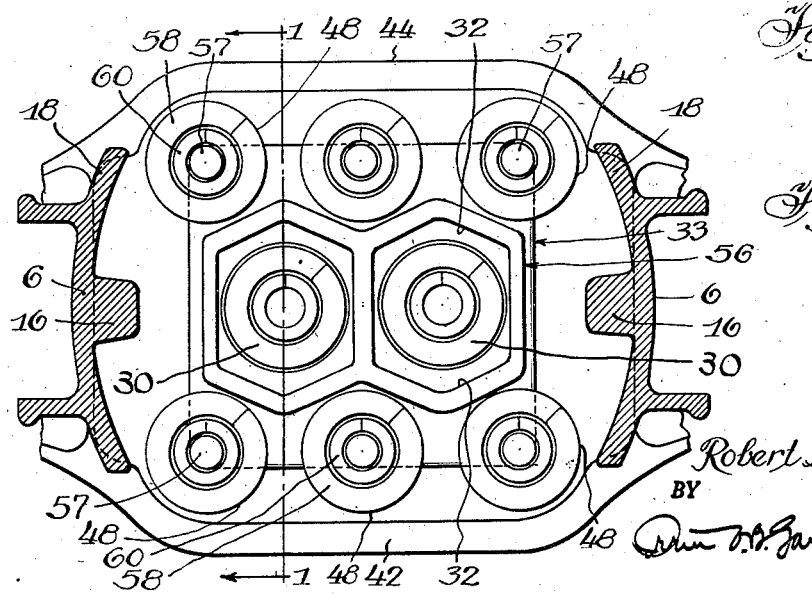
Fig.2
INVENTOR.
Robert B. Cottrell,
BY April 16, 1946.  R. B. COTTRELL  2,398,621
CAR TRUCK
Filed April 8, 1943  2 Sheets-Sheet 2
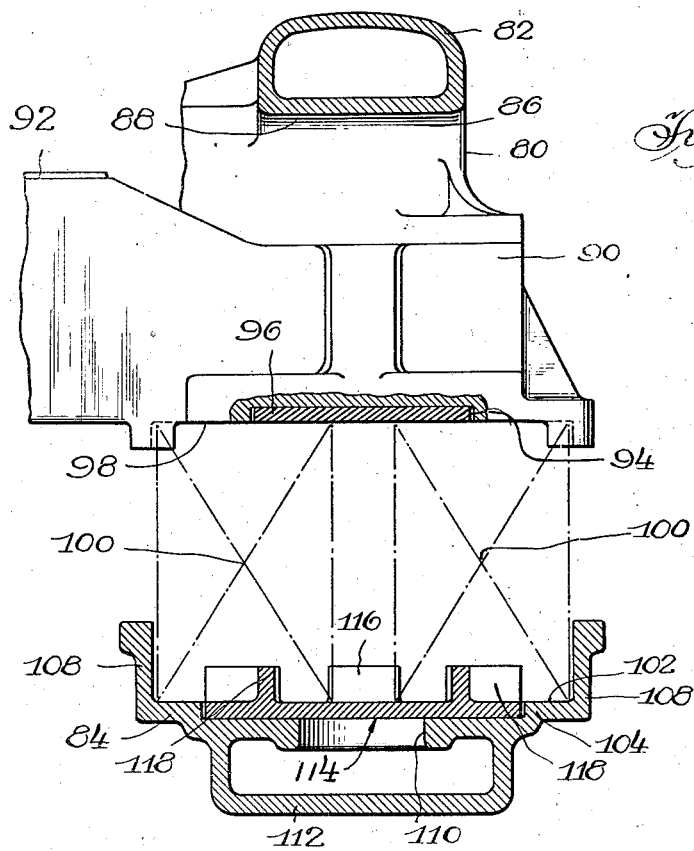
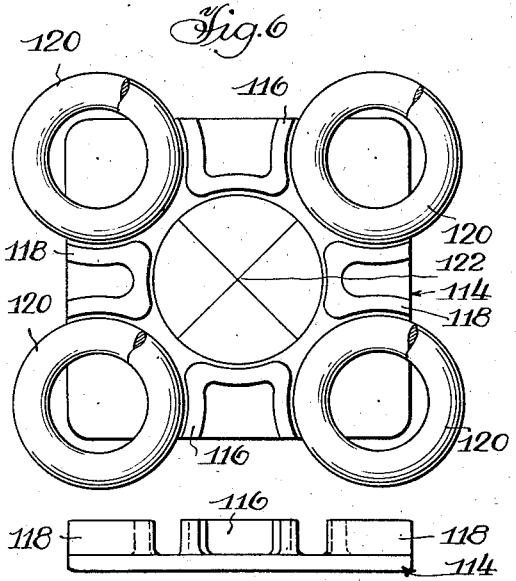
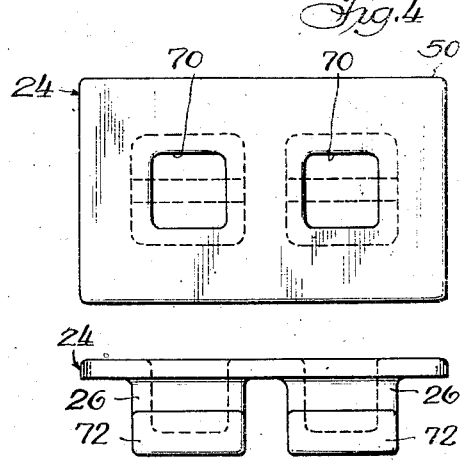
INVENTOR.
Robert B. Cottrell
BY
Orrin O. H. Garner  Atty Patented Apr. 16, 1946

2,398,621

UNITED STATES PATENT OFFICE 2,398,621

CAR TRUCK

Robert B. Cottrell, Chicago, Ill., assignor to American Steel Foundries, Chicago, Ill., a corporation of New Jersey Application April 8, 1943, Serial No. 482,255

4 Claims. (Cl. 105—197)

My invention relates in general to four wheel freight car trucks and particularly to a novel form of quick wheel change truck in which a ride control feature is incorporated. The structure shown herein is an improvement upon the general arrangement heretofore illustrated in my Patent No. 2,368,641, issued February 6, 1945, in the United States Patent Office.

The general object of my invention is to devise a novel form of quick wheel change four wheel freight car truck suitable for high speed wherein a novel form of ride control feature may be incorporated so as to provide vertical stabilization as well as control of lateral and longitudinal thrusts or out-of-square conditions.

A more specific object of my invention is to devise a car truck of the type heretofore referred to wherein the horizontal flanges of the friction housing or follower may be provided with spring positioning means adjacent the lateral edges thereof in order to form more adequate tying relationship between the springs and the various parts of the friction device.

A different object of my invention is to provide a novel form of car truck such as that described wherein the side frame may be recessed to receive alternatively a filler plate and spring positioning means or a follower friction housing for a friction device so that either may be used, as convenient.

A further object of my invention is to so arrange the friction device follower housing and the filler plate which may be substituted therefor as to accommodate a maximum number of spring group arrangements.

In the drawings,

Figure 1 is a fragmentary sectional view of a railway freight car truck, the section being taken substantially in the transverse vertical plane indicated by the line 1—1 of Figure 2 with the bolster end shown in elevation.

Figure 2 is a fragmentary view of the spring seat portion of the side frame shown in Figure 1 with a spring group thereon and the bolster removed, the section being taken in a horizontal plane through the columns in the region of the bolster guide lugs.

Figure 3 is a top plan view of my novel form of friction follower, and Figure 3A is a side elevation thereof taken from the bottom as seen in Figure 3.

Figure 4 is a top plan view of the follower wedge, and Figure 4A is a side elevation thereof taken from the bottom as seen in Figure 4.

Figure 5 is a view comparable to Figure 1 illustrating an alternative arrangement for my novel form of freight car truck wherein top and bottom filler plates are utilized to replace the friction device illustrated in Figure 1.

Figure 6 is a top plan view of the lower filler plate illustrated in Figure 5, and Figure 6A is a side elevation thereof taken from the bottom as seen in Figure 6.

My invention is illustrated as applied to a railway freight car truck comprising a truss type side frame having the compression member 2 of box section and the tension member 4 with the integrally formed spaced columns 6, 6 defining with said members the bolster opening 8 within which may be received the relatively shallow end portion 10 of the bolster 12. The bolster end portion 10 may be of box section on each side of which may be formed the vertical guide lug channel 14 of well known form for cooperation with the guide lugs 16, 16 centrally formed on the respective columns and said bolster side walls may be complementary in form to the arcuate transverse webs 18, 18 of the respective columns, said arcuate form being well illustrated in the sectional view of Figure 2. The bottom chord 20 of the box section bolster may be recessed as at 22 to receive the top follower 24 of the friction device, said top follower having a plurality of wedge elements 26, 26, each of which may have diagonal flat face engagement as at 27, 27 with opposed friction shoes 28, 28 which may be supported upon resilient means indicated at 30 and have frictional engagement along the V-shaped vertical surfaces 32, 32 of the friction follower or housing 33 (Figure 3) and clearance therefrom at the apex of said V's as seen at 34, 34 (Figure 1). The resilient means 30 may project through the opening 35 in the top chord 36 of the box section tension member 4 and seated as at 38 on the lower chord 40 thereof. The said top chord 36 may be widened and formed with upstanding inboard and outboard flanges 42 and 44 defining a spring seat 46 upon which may be carried another resilient means indicated at 48, 48.

The base plate 50 of the top follower 24 may have a thickness corresponding to the depth of the recess 22 in the bottom wall of the bolster, thus affording a surface flush with the bottom surface of the bolster against which may seat the several spring groups 48, 48, each spring group 48 being seated partially against the plate 50 and partially against the spring seat 52 on the bottom wall of the bolster. The bolster may also be formed with downwardly projecting spring positioning lugs 54, 54 in usual manner. Similarly, each spring group 48 may rest in part upon the spring seat 46 on the top chord of the tension member and in part on the bottom plate 55 of the friction follower or housing 33, said plate 55 being recessed a depth equal to its thickness in the top chord of the tension member. At opposite edges of the plate 55 may also be formed the upstanding spring positioning means 57, 57, each of which may cooperate with one spring group 48.

As illustrated in Figure 2, the composite spring group comprises the friction device generally designated 56 and the plurality of spring groups 48, 48, each of which includes an outer coil 58 and an inner coil 60, said coils being positioned with respect to the friction device by means of the before-mentioned lugs 57, 57 upstanding from the edges of the plate portion 55 of the friction housing. Each spring group 48 is further positioned along its outer perimeter by the upstanding flanges 42 and 44 of the side frame and by the vertical walls of the friction housing 33 which have a configuration convenient for that purpose.

The detail of the friction housing 33 is shown in Figures 3 and 3A. Reference has already been made to the flat base plate 55 and to the positioning means 57, 57 which upstand therefrom about the periphery thereof. Integrally formed with the base plate 55 is the friction housing 62 having the end walls 64, 64, the intermediate wall 66, and the W-shaped lateral walls 68, 68 on the inner face of each of which may be formed a plurality of V-shaped friction surfaces 32, 32 as already referred to.

The detail of the top follower or friction wedge is shown in Figures 4 and 4A. This member is formed with a flat base plate 50 with a plurality of rectangular recesses 70, 70 defined by the walls of the depending wedge lugs 26, 26 and on the opposite faces of each lug 26 may be formed a plurality of friction faces 72, 72 which may respectively engage the adjacent friction shoes of one pair.

In Figure 5 I have shown the side frame and bolster illustrated in Figure 1 equipped with top and bottom filler plates which may accommodate a great variety of spring group arrangements other than that illustrated in Figure 1. As illustrated in Figure 5, the side frame generally designated 80 is a truss type structure with a compression member 82, a tension member 84 joined by the integral column 86 to define a bolster opening 88 within which may be received the relatively shallow end portion 90 of the bolster generally designated 92. In this modification, as in the previous modification, the bolster guide lugs are centrally positioned on the columns both vertically and laterally thereof and are of such depth as to permit the bolster end to be elevated thereabove and removed from the side frame without disturbing the spring group upon which the bolster is normally seated. As illustrated in Figure 5, the bolster end 90 may have the bottom wall thereof recessed as at 94 to receive the rectangular filler plate 96, said filler plate having dimensions commensurate with those of the plate portion of the top follower illustrated in Figure 1 and forming with the spring seat 98 on the bottom face of the bolster a flat surface against which may seat the resilient means diagrammatically indicated at 100, 100. Said resilient means may rest upon the spring seat 102 formed by the widened top chord 104 of the tension member and partly defined by the inboard and outboard upstanding flanges 108, 108. Said top chord may be formed with a central opening 110 suitable for accommodation of a spring which may be associated with a friction device such as illustrated in Figure 1, in which case said last-mentioned spring would seat upon the bottom chord 112. Said top chord 104 may be recessed to receive the bottom filler plate generally designated 114 and illustrated in detail in Figures 6 and 6A.

The filler plate 114 may be formed with a plurality of upstanding spring positioning lugs 116, 116 and 118, 118 at the sides and ends thereof respectively, and each of said lugs 116 and 118 may be formed as a structure having three vertical walls, each of which is arcuate in shape and may be concentric with an adjacent coil spring such as diagrammatically indicated at 120 (Figure 6). As illustrated in Figure 6, all of the spring positioning means 116 and 118 may serve as positioning means for a central coil or snubber as diagrammatically indicated at 122.

It will thus be seen that in this improved form of my novel car truck I have illustrated an improved arrangement for accommodating a composite spring group and an alternate arrangement in which the friction device may be eliminated, if desirable, and an all-coil or a combination coil and snubber arrangement substituted with a great variety of spring group combinations accommodated therein.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame having tension and compression members and spaced columns defining therewith a bolster opening, a bolster end projecting into said opening in cooperative relation with said columns, said tension member having a widened top chord defining a spring seat, and a composite spring group positioned on said seat for support of said bolster and comprising a plurality of coil springs and a friction device, said device including top and bottom followers having their bases recessed respectively in said bolster and said top chord to form therewith spring seats for certain springs of said group, at least one of said bases having a plurality of aligned spring positioning means at each side thereof, one of said followers having a wedge form and the other of said followers being in the form of a friction housing presenting pairs of opposed V-shaped vertical friction surfaces, auxiliary springs projecting through said top chord of said tension member and seated on the bottom chord thereof and supporting pairs of friction shoes in engagement with said friction surfaces respectively and cooperating with said wedge follower.

2. In a railway car truck, a side frame having tension and compression members and spaced columns defining therewith a bolster opening, a bolster end projecting into said opening in cooperating relation with said columns, said tension member having a widened top chord defining a spring seat, and a composite spring group positioned on said seat for support of said bolster and comprising a plurality of coil springs and a friction device, said device including top and bottom followers having their bases recessed respectively in said bolster and said top chord to form therewith spring seats for certain springs of said group, at least one of said bases having a plurality of aligned spring positioning means at opposite sides thereof, one of said followers having a wedge form and the other of said followers being in the form of a friction housing, auxiliary springs projecting through said top chord of said tension member and seated on the bottom chord thereof and supporting pairs of friction shoes in engagement with said friction surfaces respectively and cooperating with said wedge follower.

3. In a railway car truck, a supporting member having a spring seat, a composite spring group thereon including a friction device comprising a housing, a member supported on said group, and removable wedge means associated therewith and vertically movable therewith relative to said housing for actuation of said device, certain springs of said group being under direct compression between a portion of said housing and said wedge means and acting to maintain said wedge means in normal operative position, said housing having a bottom flange with positioning means spaced about the periphery thereof for said springs, said housing having corrugated walls and said positioning means being so spaced about said periphery as to accommodate positioning of said springs in said corrugations.

4. In a railway car truck, a supporting member having a spring seat, a composite spring group thereon including a friction device comprising a housing with corrugations in the walls thereof, a member supported on said spring group, removable wedge means associated with said supported member for actuation of said device, certain springs of said group being under direct compression between a portion of said housing and said wedge means, said housing comprising sets of opposed V-shaped vertical friction faces, and pairs of friction shoes seated against said sets respectively and in engagement with said wedge means and said certain springs, said portion having integrally formed therewith positioning means for said certain springs, said positioning means being so spaced about said portion as to accommodate positioning of other of said springs in said corrugations.

ROBERT B. COTTRELL.